United States Patent [19]
Breault et al.

[11] Patent Number: 4,824,739
[45] Date of Patent: Apr. 25, 1989

[54] METHOD OF OPERATING AN ELECTROCHEMICAL CELL STACK

[75] Inventors: Richard D. Breault, Coventry; Michael J. Rajpolt, Marlborough; John C. Trocciola, Glastonbury, all of Conn.

[73] Assignee: International Fuel Cells, South Windsor, Conn.

[21] Appl. No.: 115,298

[22] Filed: Nov. 2, 1987

Related U.S. Application Data

[62] Division of Ser. No. 947,168, Dec. 24, 1986, Pat. No. 4,756,981.

[51] Int. Cl.⁴ .............................................. H01M 8/04
[52] U.S. Cl. .................................... 429/13; 429/35; 429/41; 29/623.2
[58] Field of Search .................. 429/13, 34, 35, 36, 429/41; 29/623.2

[56] References Cited

U.S. PATENT DOCUMENTS

| | | | |
|---|---|---|---|
| 3,867,206 | 2/1975 | Trocciola et al. | 429/35 |
| 4,129,685 | 12/1978 | Damiano | 429/38 |
| 4,269,642 | 5/1981 | DeCasperis et al. | 156/89 |
| 4,365,008 | 12/1982 | DeCasperis et al. | 429/36 |
| 4,505,992 | 3/1985 | Dettling et al. | 429/36 |
| 4,652,502 | 3/1987 | Breault et al. | 429/13 |

FOREIGN PATENT DOCUMENTS 0122150 of 0000 European Pat. Off. .
0080159 2/1983 European Pat. Off. .

Primary Examiner—Anthony Skapars
Attorney, Agent, or Firm—Gene D. Fleischhauer

[57] ABSTRACT

A seal structure 60 for a porous plate of an electrochemical cell, such as plates 18, 20, includes a sealing material disposed in a seal region 66 of the plate to form a hydrophilic barrier to gas with an electrolyte and a hydrophobic layer 62 to block the loss of electrolyte from the hydrophilic layer is disclosed. Various construction details including a method for making the plate are disclosed which increase the cross pressure the sealing region of the plate can withstand. In one embodiment, the seal region 66 is impregnated with powder having a low structure and predetermined particle size using a pressurized liquid carrier. A FEP Teflon film bonds adjacent electrolyte reservoir plates together.

7 Claims, 3 Drawing Sheets

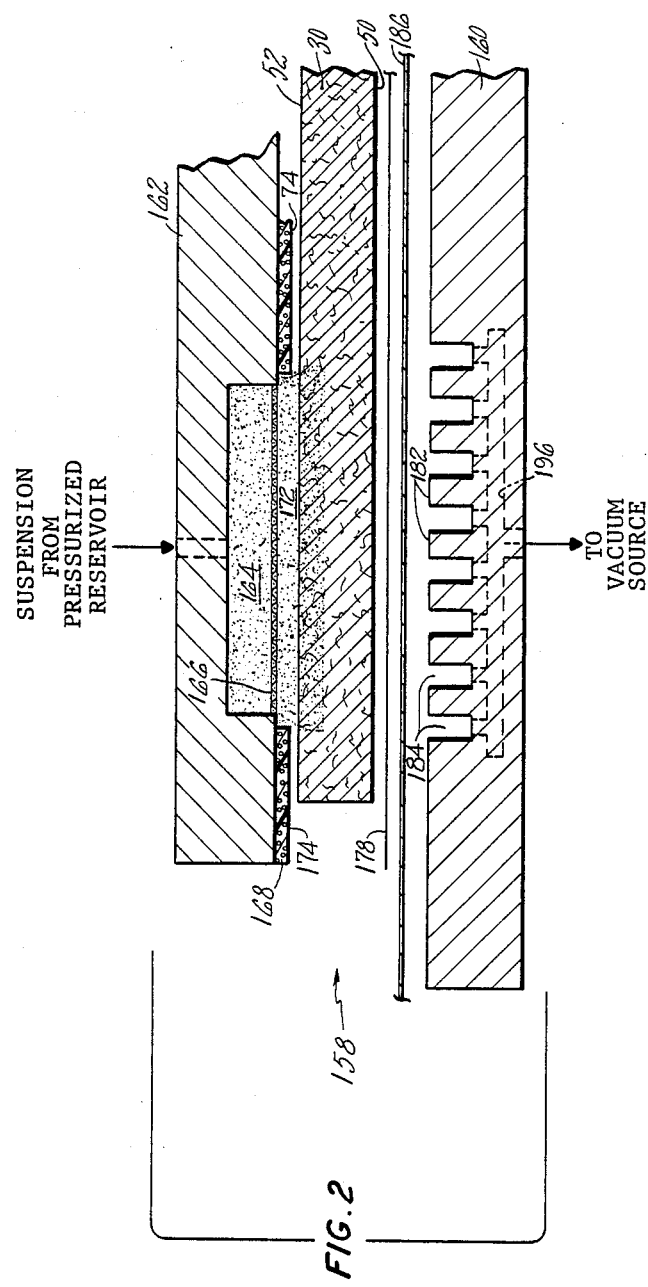

METHOD OF OPERATING AN ELECTROCHEMICAL CELL STACK

This is a division of application Serial No. 947,168 filed on Dec. 24, 1986 now U.S. Pat. No. 4,756,981.

TECHNICAL FIELD

This invention relates to a seal for a porous plate of the type used in electrochemical cells, such as fuel cell powerplants. Although this invention was developed for use in the field of phosphoric acid fuel cell powerplants, the invention has application to other electrochemical cells employing such seals including fuel cells employing a base or a molten carbonate for an electrolyte.

BACKGROUND OF INVENTION

Fuel cell powerplants produce electric power by electrochemically consuming a fuel and an oxidant in one or more electrochemical cells. The oxidant may be pure oxygen or a mixture of gases containing oxygen, such as air. The fuel may be hydrogen.

Each fuel cell generally has electrodes for reacting the gases, such as an anode electrode for fuel and a cathode electrode for an oxidant. The cathode electrode is spaced from the anode electrode and a matrix saturated with electrolyte is disposed between the electrodes.

Each electrode includes a substrate. The substrate has a catalyst layer disposed on the side of the substrate which faces the electrolyte matrix. In some instances, an electrolyte reservoir layer, such as an electrolyte reservoir plate is on the other side of the substrate and is capable of providing electrolyte through small pores to the substrate. These electrolyte reservoir plates may have channels or passageways behind the substrate for carrying a reactant gas, such as gaseous fuel to the anode and gaseous oxidant to the cathode. For example, these channels might extend between parallel ribs on the substrate side of the electrolyte reservoir plate. A separator plate on the other side of the electrolyte reservoir plate provides a barrier to the transfer of electrolyte and prevents mixing of the fuel and oxidant gases in adjacent cells. Another acceptable construction is to have the electrode substrate act both as an electrolyte reservoir plate and as an electrode substrate with channels on the separator side of the substrate.

Examples of electrolyte reservoir layers are shown in commonly owned U.S. Pat. Nos. 3,779,811; 3,905,832; 4,035,551; 4,038,463; 4,064,207; 4,080,413; 4,064,322; 4,185,145; and 4,374,906.

Several of these patents show the electrolyte reservoir layer as an electrode substrate. In addition to accommodating changes in acid volume due to electrolyte evaporation and changes in operating conditions of the cell electrode, substrates must satisfy several other functional requirements. For example, the substrate must be a good electrical conductor, a good thermal conductor and have adequate structural strength and corrosion resistance. The substrate must provide support to the catalyst layer and provides a means for gaseous reactants to pass to the catalyst layer. Finally, the edges of the substrate are often required to function as a wet seal to prevent the escape of reactant gases and electrolyte from the cell.

One way to form a wet seal is to reduce the pore size of the edge region by densifying the edge region, such as through compression during substrate fabrication, and providing a liquid, such as electrolyte to the densified edge region. Densified substrate edge seals are described in commonly owned U.S. Pat. Nos. 4,269,642 and 4,365,008. Experience has shown that the seal density and pore size that can be practically obtained limits the edge seal cross pressure (or, commonly called the bubble pressure) to 3-4 psi.

Another approach to forming the seals is described in U.S. Pat. No. 4,867,206 entitled "Wet Seal for Liquid Electrolyte Fuel Cells" issued to Trocciola et al, which is commonly owned with the present invention. Another example is shown in commonly owned U.S. Pat. No. 4,259,389 issued to Vine entitled "High Pressure-Low Porosity Wet Seal". As discussed in Vine, a seal may be formed in the edge seal region of a porous plate by using a powder filler to provide a denser packing to the region which reduces porosity.

An improved edge seal is described in copending, commonly owned, U.S. patent application Ser. No. 814,423, filed Dec. 30, 1985, now U.S. Pat. No. 4,652,502 entitled "Porous Plate for an Electrochemical Cell and Method for Making the Porous Plate" filed by Richard D. Breault, a coinventor of this application, and John D. Donahue. In this construction, the electrolyte reservoir layer is a substrate or an electrolyte reservoir plate. The edge seal regions of such porous plates are filled with a high solids, low structure powder which is introduced into the region in suspension form under pressure. The pores of the seal are formed within the edge of the porous plate upon removal of the liquid from the suspension. Such a seal is able to tolerate transient cross-pressure which are an order of magnitude larger than the cross-pressures encountered in the edge region during the normal operation.

Generally, a stack of fuel cells and separator plates are used in performing the electrochemical reaction. As a result of the electrochemical reaction, the fuel cell stack produces electric power, a reactant product, and waste heat. The stack includes a cooling system for removing the waste heat from the fuel cell stack. The cooling system has a coolant and conduits for the coolant disposed in cooler holders to form coolers within the stack. Heat is transferred by the cooler holders from the fuel cells to the conduits and from the conduits to the coolant.

The cooler holder must be electrically and thermally conductive and may be permeable to gas. An example of such a cooler holder is shown in U.S. Pat. No. 4,245,009 issued to Guthrie entitled "Porous Coolant Tube Holder for Fuel Cell Stack". Alternatively, the cooler holder might be impermeable to gas. An example of such a cooler holder is shown in U.S. Pat. No. 3,990,913 issued to Tuschner entitled "Phosphoric Acid Heat Transfer Material". In Tuschner, the cooler holder serves the double function of cooler holder and separator plate.

As discussed, separator plates prevent the mixing of the fuel gas, such as hydrogen, disposed on one side of the plate, with an oxidant, such as air, disposed on the other side of the plate. Separator plates must be highly impermeable to gases such as hydrogen and thermally and electrically conductive to pass heat and electrical current through the fuel cell stack. In addition, separator plates must also tolerate the severe corrosive atmosphere formed by the electrolyte of the fuel cell, such as hot phosphoric acid, while preventing electrolyte transfer from cell to cell. Finally, separator plates, like cooler holders, must be strong, particularly in terms of flexural strength, which is a measure of the ability of the separator plate to withstand high pressure loads, differential thermal expansion of mating components, and numerous thermal cycles without cracking or breaking.

An example of a method for making separator plates for electochemical cells is discussed in U.S. Pat. No. 4,360,485 issued to Emanuelson et al., the disclosure of which is hereby incorporated by reference. In this method, the separator plate is formed by molding and then gaphitizing a mixture of preferably 50 percent high purity graphite powder and 50 percent carbonizable thermosetting phenolic resin. In particular, Emanuelson discusses forming a well blended mixture of the appropriate resin and graphite powder. The mixture is then distributed in a mold. The mold is compacted under pressure and temperature to melt and partially cure the resin and to form the plate.

The separator plate, because it is a separate component adds complexity and expense to the manufacture of a fuel cell stack. Efforts have been directed at eliminating such components by bonding together adjacent plates. For example, a gas separator disposed between the adjacent cathode and anode porous members might be a gas impermeable layer as discussed in U.S. Pat. No. 4,129,685 issued to Damiano entitled "Fuel Cell Structure" which is assigned to the asignee of the present application. In Damiano, two porous members may provide a flow path for the flow of a reactant gas and may be bonded to each other by the gas separator layer that is a thick or thin coating.

U.S. Pat. No. 4,505,992 issued to Dettling et al. entitled an"Integral Gas Seal for Fuel Gas Distribution Assemblies and Method of Fabrication" is another example of such constructions. The gas distribution plate members are bonded together at their interface with a sealant material which extends into the pores of at least one of said porous plates. The sealant material may be selected from the group consisting of fluorinated ethylene-propylene, polysulphone, polyethersulfone, polyphenylsulphone, perflorinated alkoxy tetrafluoroethylene, and mixtures thereof.

Dettling describes a fabrication process for forming the integral assembly of the two porous plates. The process includes providing two porous plates and a layer of sealant material between the plates. The plates and layer of sealant material are subjected to pressure and elevated temperature to melt the layer. As a result, the material in the layer impregnates the porous plates as it melts flowing into the pores to bond the plates together and to seal each plate along the interface against gas transfer.

As noted in Dettling, the presure applied to the two carbon plates must be great enough to force the opposite surfaces of the plates together but not so great as to damage the underlying structure of the plates.

The above art notwithstanding, scientists and engineers are still seeking to develop seal structures for use between the porous plates of electrochemical cells such as the integral separator plates or other plates in abutting contact.

DISCLOSURE OF INVENTION

According to the present invention, a pair of adjacent electrochemical cells includes a hydrophobic, gas permeable, liquid barrier and a hydrophilic gas barrier, the barriers being thermally and electrically conductive for passing heat and electrical charge through the barriers while blocking the transfer of electrolyte and the mixing of reactant gases from adjacent cells.

In accordance with one embodiment of the present invention, the hydrophilic gas barrier is a wettable fine pore structure filled with a liquid.

In accordance with one particular embodiment of the present invention, the wettable fine pore structure for the hydrophilic gas barrier is formed: by making a precursor sealing material suspension having a high solids content which is of an amount which avoids gross volume reductions of the sealing material after the liquid is removed from the suspension; and, filling the void volume of the seal region by applying pressure to the precursor sealing material which is greater than five pounds per square inch to force the sealing material into the substrate.

A primary feature of the present invention is a pair of adjacent electrochemical cells which includes a hydrophilic gas barrier adjacent to a gas permeable, hydrophobic liquid barrier. In one embodiment, the hydrophobic barrier is formed of a flourinated ethylene-propylene (FEP) resin. The resin extends into two adjacent porous plates. At least one of the plates has a seal region having a hydrophilic gas barrier when filled with electrolyte. The hydrophilic seal region has a first pore size distribution which is smaller than the pore size distribution of the remainder of the plate. In one embodiment, the densifier seal region has a pore size which is substantially smaller than the pore size of a less densified region in a nonsealing region of the plate. For example the seal region may have a density in an electrolyte reservoir plate which is two-hundred and thirty (230) percent of the non-sealing region with a pore size in the seal region which is at least twice as small as the pore size of the non-sealing region. In other embodiments, the hydrophobic liquid barrier may be in one plate or both plates and the hydrophilic barrier may be in one plate or both plates in a region adjacent to the hydrophobic barrier. In an alternate embodiment, the hydrophilic barrier is placed on the oxidant side of the cell. At least one embodiment, the oxidant side of the cell will run at a higher pressure under some operative conditions than the fuel side of the adjacent cell.

A primary advantage of the present invention is the decreased gas permeability of a seal structure having the two different types of barriers as compared with structures which only have a single barrier. The decreased permeability results from the cooperation between the barriers, especially where the hydrophilic seal region filled with electrolyte blocks the gas from leaving the porous plate and the gas in turn forces the electrolyte against the hydrophobic barrier layer which acts to keep the electrolyte in place. The advantage is still realized when the gas pressure acts in the opposite direction because the hydrophobic barrier layer reduces the pressure that the escaping reactant gas can exert on the hydrophilic seal region. Still another advantage is the reduced cost and complexity of a fuel cell during manufacture and use, which results from eliminating the separator plate by bonding together two electrolyte reservoir plates with a layer. Another advantage is the reduced electrolyte transfer from cell to cell which results from the hydrophobic barrier which acts to block movement of the electrolyte.

The foregoing features and advantages of the present invention will become more apparent in light of the following detailed description of the best mode for carrying out the invention and the accompanying drawings.

A BRIEF DESCRIPTION OF THE DRAWINGS

FIG. 2 is a side elevation view in exploded form for clarity of an apparatus for forcing precursor sealing material suspension into a porous plate.

BEST MODE FOR CARRYING OUT THE INVENTION

Figure 1:
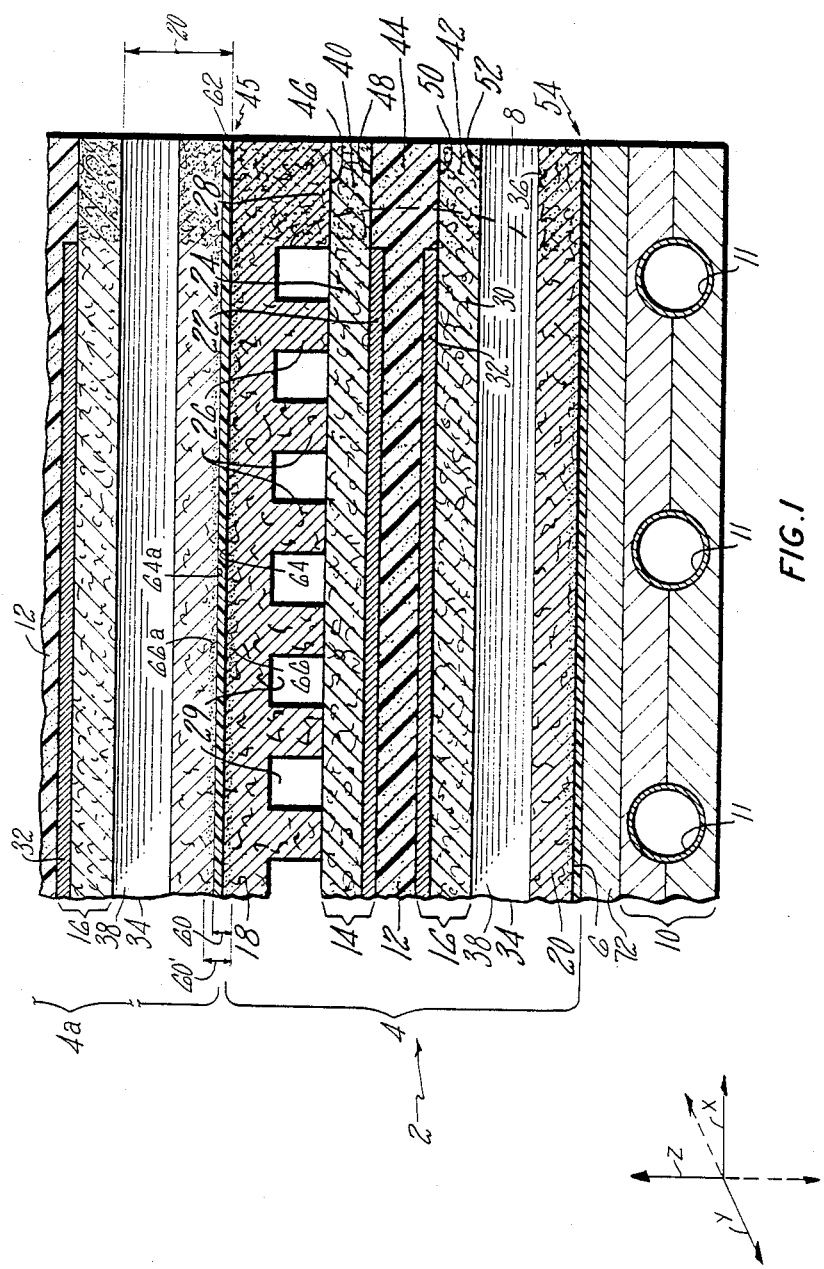
FIG. 1 is a cross-sectional view of a portion of an electrochemical cell stack including electrolyte reservoir layers, such as a substrate or an electrolyte reservoir plate, having sealing material deposited in a seal region adjacent to the edge and at the interface of adjacent porous plates and a hydrophobic barrier in close proximity thereto.

FIG. 1 is a cross-sectional view of an embodiment of the present invention which is employed in an electrochemical cell assembly such as a fuel cell powerplant. A portion of a fuel cell stack 2 of such a powerplant is shown.

The fuel cell stack 2 includes one or more fuel cells as represented by the fuel cell 4 and a portion of the adjacent cell 4a.

Each fuel cell has two faces, such as planar surfaces 6, and sides or edges, such as the four edges as represented by the single edge 8. Cooler holders, as represented by the single cooler holder 10, are spaced at intervals between sets of fuel cells. The cooler holders are adapted to receive conduits 11 for a coolant.

Each fuel cell includes an electrolyte retaining matrix 12 disposed between an anode electrode 14 and a cathode electrode 16. An electrolyte reservoir plate 18 is adjacent the anode and an electrolyte reservoir plate 20 is adjacent the cathode. The term "plate" is used in its board sense and includes plates that are curved or flat and porous or solid. The particular cell shown uses phosphoric acid as the electrolyte. Each anode electrode 14 has a catalyst layer 22 and an electrode substrate 24 which supports the catalyst layer. The substrate is a porous plate and acts as a gas permeable reservoir layer for the electrolyte. The catalyst layer is bonded to the substrate and is formed of catalyst particles bonded together with a hydrophobic material such as polytetrafluoroethylene. One such catalyst is platinum supported on carbon particles.

The porous electroltye reservoir plate 18 has ribs 26 and an edge portion 28. The ribs are spaced apart leaving passages 29 for fuel therebetween which extend laterally across the plate in the Y-direction to one of the edges 8 (not shown) of the cell. A suitable fuel, such as hydrogen, is flowed through the passages 29 between the reservoir layer (substrate 24) and the electrolyte reservoir plate 18 and from the passages to the catalyst layer 22.

Electrolyte transfer between the matrix 12 and both the electrolyte reservoir plate 18 and reservoir layer 24 occurs directly through the pores of the catalyst layer 22 which is partially hydrophilic. The catalyst layer may have holes to aid in this liquid transfer. This distribution of electrolyte within the cell occurs as a result of the capillarity of porous structures (that is, the surface tension phenomenon of the gas-liquid interface) which causes the porous structure to develop capillary forces. The smaller the pore, the larger the capillary force and the greater the liquid retention capability.

The cathode electrode 16, like the anode electrode 14, has a substrate 30 and a catalyst layer 32. The catalyst layer is bonded to the substrate.

The electrolyte reservoir plate 20 adjacent the cathode has a plurality of ribs, as represented by the single rib 34. The ribs are spaced apart to define passages 38 for the oxidant which extend laterally in the X-direction across the plate to the edge 8 (shown). These passages generally extend perpendicular to the passages 29. As oxidant, such as the oxyen contained in air, is flowed through these passages between the substrate reservoir layer 30 and the electrolyte reservoir plate 20 and from the passages through the substrate to the catalyst layer 32.

Each porous plate having a reservoir layer has a peripheral seal region. For example, the anode substrate 24 has a peripheral seal region 40, the cathode substrate 30 has a peripheral seal region 42, and electrolyte reservoir plates have peripheral sealing regions in the edge region 28 extending parallel to the endmost passage of the passages 29 and in the edge region (not shown) extending parallel to the endmost passage of the passages 34. Each seal region is filled with sealing material to adapt the seal region to form a seal with the electrolyte. The sealing material comprises an inert powder selected from the group consisting of carbon, graphite, silicon carbide and mixtures thereof. The powder has a particle size which is less than one micron and a low structure to facilitate dispersal of the powder to the original prime particles to aid in forming a high solid low viscosity suspension. The sealing material increases the density of the seal region of the substrate thus decreasing the pore size and porosity of the plate.

Thus, substantially all the pores of the edge region (the pore size distribution of the edge region) are smaller than substantially all the pores (that is, the pore size distribution) in a region spaced away from the edge region, such as the ribs 26. Because the pores of the seal region are smaller than the remainder of the plate, the entire volume of the seal region remains essentially completely filled with electrolyte and no path for gas extends through the seal as long as the pore size of the edge region is smaller than the pore size of the matrix or, if larger, as long as the matrix 12 and edge region are filled with electrolyte. Liquid seals are thereby formed by sandwiching the sealing portions between the edge portions of the upper adjacent structure at 45 and the edge portion of the lower adjacent structure at 54. Thus, these liquid seals extend to the locations 45, 46, 48, 50, 52, and 54.

The capillarity resulting from the surface tension of liquid in porous structures, such as electrolyte in the seal region, causes capillary forces which resist movement of the liquid electrolyte from the pores of the seal region. The smaller the pore, the larger the capillary force at the gas-liquid interface and the larger the ability to resist differences in pressure between reactant gases in the fuel cell and between any reactant gas and the exterior of the cell. By reason of the method used to fill the seal region with the sealing material, the seal formed in the substrate can resist steady state gas pressures and even transient differences in pressure which can range between 5 and 30 psia.

As discussed earlier, a laterally extending seal structure 60 is provided to the adjacent pair of cells 4, 4a at the faces 6. The seal structure extends laterally to the edge seal and provides a means for blocking the transfer of electrolyte and mixing of reactant gases, from fuel cell 4 and fuel cell 4a. Thus, the seal structure 60 blocks the leakage of gaseous reactants and electrolyte in a direction Z which is generally normal (perpendicular) to the lateral directions X and Y.

The seal structure 60 includes a gas permeable, hydrophobic liquid barrier 62 which is a portion of the cathode electrolyte reservoir plate 20 of fuel cell 4a. The hydrophobic barrier has two faces, 64 and 64a. The seal structure also includes a hydrophilic seal region 66 which is a portion of the porous electrolyte reservoir plate 18 of fuel cell 4. In the embodiment shown, the hydrophilic seal region is dipsosed in the void structure of the plate 18. Plate 18 abuts plate 20 and the hydrophilic seal region is filled with electrolyte which extends to the face 64 of the hydrophobic liquid barrier.

As shown for seal structure 60; the seal structure might also include a second hydrophilic seal region 66a. This seal region is in the void structure of porous electrolyte reservoir plate 20 of fuel cell 4a and is filled with electrolyte which extends to the hydrophobic liquid barrier.

The hydrophilic gas barriers may be formed in the same way as the edge seal 28. Each has a pore size distribution which is equal to or smaller than the edge seal. Preferably, the pore size distribution is also equal to or smaller than the pore size distribution of the matrix. As a result, each seal region has a capillarity characteristic which adapts the seal region to form a hydrophilic gas barrier which extends in the second Z-direction to the hydrophobic liquid barrier and laterally to the edge seal 28.

The hydrophobic liquid barrier 62, which is used with the hydrophilic barrier 66 or 66a, may include an adhesive selected from the group consisting of fluorinated etheylene-propylene resin, polytetrafluoroethylene (TFE) resin, perfluoroalkoxy resin (PFA-Teflon), mixtures thereof or any polymer which is chemically compatible with the electrolyte of the cell. One fluorinated etheylene-propylene resin adhesive is FEP-Teflon adhesive available from E.I. DuPont de Nemours Company as Type A Teflon FEP film. One process for forming the hydrophobic liquid barrier includes the step of placing a FEP-Teflon film against the porous electrolyte reservoir plate 20 and heating the film under the pressure until the FEP-Teflon film flows into the porous plate.

Figure 1B:
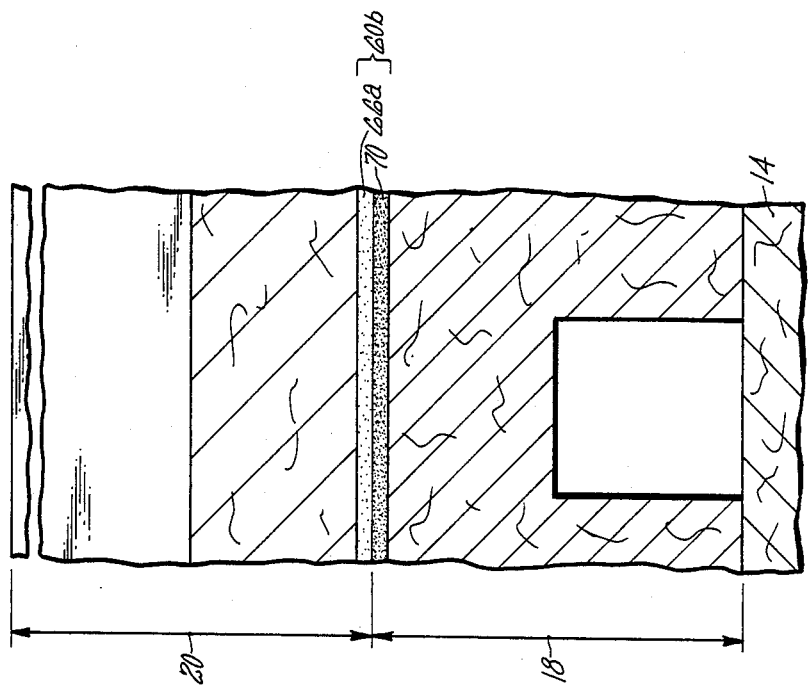
FIG. 1b is an enlarged cross-sectional view of another alternate embodiment of the seal structure 60 shown in FIG. 1.
Figure 1A:
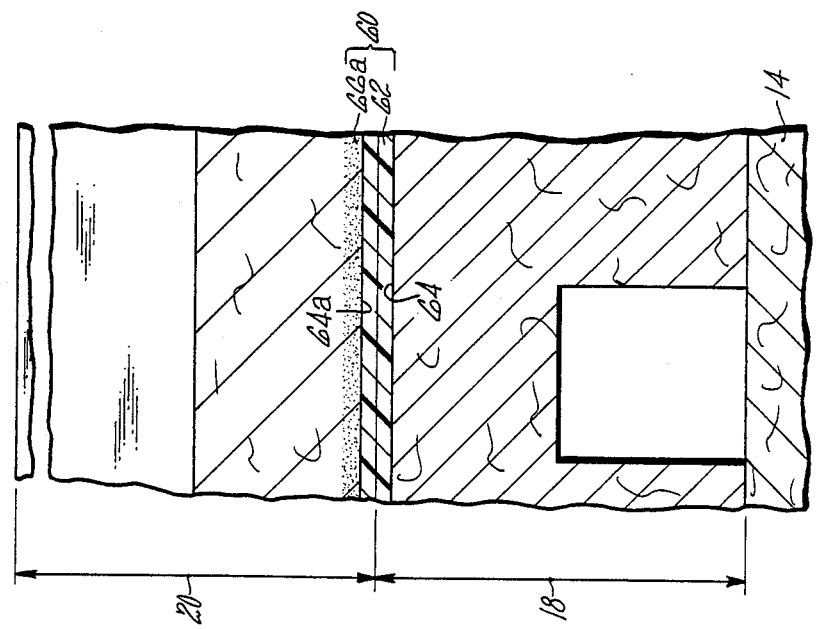
FIG. 1a is an enlarged cross-sectional view of an alternate embodiment of the seal structure 60 shown in FIG. 1.

Alternatively, the FEP-Teflon film might be disposed in both plates, joining the plates together as shown in FIG. 1a and forming a gas permeable, hydrophobic barrier in both plates. A hydrophilic barrier 66a is disposed in the electrolyte reservoir plate 20. One process for forming the hydrophobic liquid barrier in both plates includes the step of placing a FEP-Teflon film between two porous plates, such as the electrolyte reservoir plate 18 for the anode electrode 14 of cell 4 and the electrolyte reservoir plate 20 for the cathode electrode 16 of cell 4a. Film thicknesses of two to twenty-five (2-25) mils have been found satisfactory. After placing the film between the plates, the three layer assembly is heated to six-hundred and forty (640) degrees Fahrenheit for seven to twelve minutes while pressing together the plates under a pressure of one-hundred (100) pounds per square inch. The assembly is transferred to a cold laminating press and cooled to four-hundred (400) degrees Fahrenheit.

The one-hundred (100) pounds per square inch hot-cold press sequence displaces the FEP-Teflon adhesive from the fiber to fiber contacts and retains good contact by freezing the FEP-Teflon film and locking the structure. As a result, molten FEP film is forced into the surfaces of the electrolyte reservoir plate and provides a film which is a barrier to the electrolyte.

As shown in FIG. 1b, an alternate embodiment 60b of the seal structure 60 employs a hydrphobic barrier 70 in combination with a hydrophilic barrier 66a for blocking the leakage of reactant gases in the Z-direction. In this embodiment, the electrolyte reservoir plate 20 is coated with a hydrophilic material to create the hydrophilic seal region 66a having a smaller pore distribution than the remainder of the electrolyte reservoir plate. The hydrophilic seal region acts as a barrier to the gas as does the hydrophilic seal regions shown in FIG. 1 and FIG. 1a. The adjacent plate is the porous electrolyte reservoir plate 18 of the adjacent cell. The plate 18 is coated with a hydrophobic fine pore liquid barrier 70. The combination of the two barrier materials creates the means 60b for blocking the flow of reactant gases from the passages which extend through the electrolyte reservoir plates 18, 20.

One method for applying these fine pore layers is described in Example 1c. This method uses a process similar to the cloud process used to apply catalyst layers to a substrate as discussed in U.S. Pat. No. 4,175,055, entitled Dry Mix Method for Making an Electrochemical Cell Electrode issued to Glen J. Goller, et al. Another possible composition of the hydrophobic acid barrier is thought to be a 5 mil thick barrier made with highly conductive carbon black such as Black Pearl 2000 carbon black available from the Cabot Corporation, 125 High Street, Boston, Mass. The carbon black is combined with sixty (60) percent by weight tetrafluoroethylene Teflon such as TFE-30 Teflon available from the E. I. duPont de Nemours Company. The combination of carbon black and teflon binder is sintered at six-hundred and eighty (680) degrees Fahrenheit.

The hydrophilic gas barrier layer might be formed of a five (5) mil thick layer made from graphitized carbon black such as Vulcan XC-72 carbon black available from the Cabot Corporation mixed with a twenty (20) percent tetrafluoroethylene layer such as TFE-30 Teflon available from E.I. duPont de Nemours and sintered at about five-hundred and eighty (580) degrees Fahrenheit. The graphitized carbon black is preferred to provide the required oxidation resistance. The hydrophilic layer is placed on the cathode or oxygen side of the cell where contact with the acid filled electrolyte reservoir plate will tend to lower the electrolyte potential and minimize corrosion. This results because corrosion of the filler is lower at lower potentials.

As shown in FIG. 1, the combination of a hydrophilic gas barrier and hydrophobic liquid barrier might be used with a separator plate 72 of conventional design which is permeable over a portion of its interior by reason of a defect in the separator plate or, in other applications, with a gas permeable sheet metal separator plate.

FIG. 2 is an exploded side elevation view of an apparatus 158 for filling a porous plate of an electrochemical cell, such as the electrolyte reservoir plate or the cathode substrate 30 with a sealing material. The apparatus includes a first suction plate 160 and a second distribution plate 162 each of which is adapted to engage an associated surface (that is, surface 50 or 52) of the substrate. The second distribution plate has an axially extending cavity 164 which is about the axial width of the seal to be formed in the porous plate. Alternatively, the cavity 164 may be coextensive with the porous plate to fill an entire face of a porous plate with the seal material. In such a case, the seal region only extends for a predetermined depth to provide the necessary seal region which prevents an unacceptable flow of gas through the barrier.

As shown, the cavity is bounded on three sides by the distribution plate. A screen 166 bounds the cavity on the fourth side. The mesh size of the screen is one hundred. In other embodiments, the screen may be omitted and the distribution plate 162 interchanged with plate 160 such that gravitational force does not act to pull the sealing material suspension from the cavity.

A gasket 168 extends circumferentially about the cavity 164 leaving a flow region 172 therebetween. One satisfactory material for the gasket is a medium closed cell neoprene foam such as COHRlastic foam available from the Auburn Rubber Company of Middletown, Connecticut. The gasket is adapted by a surface 174 to engage the surface 52 of the porous plate.

A translatable belt 186 carried the porous plate into a region between the facing distribution and suction plates. The belt is a Nytex belt available from Nazdar K.C. Coatings, Taerboro, New Jersey and is a nylon monofilament stencil fabric belt approximately 7.8 mils thick having mesh size of 63 with a 48.5% open area. A porous paper 178 is disposed between the belt and the porous plate. The porous paper is a bleached medium felt paper which is commonly available for use in medical offices.

The first plate 160 has a plurality of transversely extending ribs 182 which are spaced apart axially leaving a plurality of gaps 184 therebetween. These gaps are in flow communication through conduit 196 with a vacuum device which decreases the pressure in the gaps 184 during operation for the apparatus shown in FIG. 2. In other embodiments, a vacuum is not created in the gaps 184.

During operation of the apparatus shown in FIG. 2, the porous plate 30 is disposed between the first and second plates 160, 162 by movement of the belt 186 into position. The plates move relative to each other to clap the porous plate between the two plates. The cavity 164 is in flow communiation with a source of the precursor sealing material in suspension form. The suspension is supplied under a significant pressure which is generally greater than ten pounds per square inch across the porous plate.

As the suspension is forced into the porous plate 30, the first plate 160 is placed in flow communication with a vacuum source and draws through the Nytex belt a portion of the suspension. After filling the seal region of the porous plate with the sealing material, the porous plate is moved to location where the fluid can be completely removed by evaporation, such as by heating, leaving behind the deposited sealing material.

The precursor sealing material suspension for the edge region comprises a liquid, such as water, and an inert powder disposed in the liquid such as the carbon, graphite or silicon carbide already mentioned. The powder has a variable particle size which is less than or equal to one micron and a low structure which is determined by the aggregate size and chaining, the number of particles per wieght of aggregate, and their average mass. The characteristics of structure effect the aggregate packing and the volume of voids in the bulk material. Structure is measured in terms of void volume and, in particular, using the DBPA method to which is assigned a number as set forth in ASTMD 2414 which is promulgated by the American Society for Testing and Materials. The powder is considered to have a low structure if it has a DBPA number which is less than 50 milliliters per 100 grams. The step of forming the precursor sealing material suspension includes adding the powder to the liquid and mechanically agitating the suspension to avoid clumping. Thus, the powder is added to the suspension, the powder is thoroughly mixed and more powder is added to the suspension. A surfactant or dispersant is added to the liquid to increase the wetting of the powder and to aid in the mixing. This process continues until the solids content reaches a level which avoids a gross volume reduction of the sealing material after the liquid is removed from the suspension.

This is important because a gross volume reduction, such as accompanies the material collapsing on itself after the liquid is removed, will result in pore sizes much greater than if the sealing material remains close to the orientation it had when held in place by the liquid. It has been found that a large solids content, typically greater than sixty 60% by weight of the suspension, avoids the gross volume reduction because the particles have enough points of contact such that they support each other and remain in a relatively fixed position even after the liquid is removed.

One empirical method of determining whether a gross volume reduction has occurred is to impregnate a porous plate with an amount of the sealing material by the above method, remove the liquid and fill the material with the electrolyte and then measure the cross-pressure. If the cross-pressure is high, several psi and usually equal to or greater than 5 psi, then the sealing material has not suffered a gross volume reduction.

Thus, the precursor sealing material suspension has a high solids content. The high solids content enables each particle to engage adjacent particles after the liquid is removed from the suspension. As a result, the sealing material has a certain amount of structural rigidity and smaller pores than if the particles did not support each other and could collapse with a gross volume reduction and an enlargement of pore sizes. The small porse exhibit a capillarity characteristic (cross-pressure for a given liquid at a given temperature) for concentrated phosphoric acid at seventy-five degrees Fahrenheit which is in excess of five pounds per square inch. A measurement of the capillarity characteristic confirms that the sealing material has not suffered a gross volume reduction.

Another approach for determining the solids content needed to avoid a gross volume reduction in the sealing material which is nearly as certain as the method outlined above, is to form the suspension and evaporate the liquid from the suspension. A resulting residue which maintains its structural form with no large discontinuities in the surface of the residue indicates that a gross volume reduction has been avoided. However, if large cracks appear in the surface, called "mud cracking", it is likely that the solids content of the suspension is not sufficient to maintain the high cross-pressure across the seal once the seal region is filled with the sealing material.

In addition, a small amount of binder which is inert in the environment of the electrolyte of the fuel cell, such as polytetrafluoroethylene, might be added to the suspension. The binder acts as a further adhesive between particles to increase the structural rigidity of the group of particles. Generally, about up to five (5) percent by weight of the suspension of polytetrafluoroethylene will be added to the suspension. It is desirable to avoid using larger amounts of polytetrafluoroethylene because this binder, while inert in the environment of the fuel cell, is hydrophobic and too much of the binder can destroy the ability of the seal to develop high capillary forces with the electrolyte. Again, the amount of permissible polytetrafluoroethylene can be established empirically by forming the seal with a given high solids content and then measuring the cross-pressure the seal can tolerate when containing the electrolyte.

One particular sealing material currently being used having a low structure, submicron carbon powder is a sealing material using Thermax Carbon Powder available from the R.T. Vanderbilt Company, Inc., 30 Winfield Street, Norwalk, Conn. 06855. The ASTM designation is N-990 and has a typical DBPA of about 35 milliliters per hundred grams according to measurement standard ASTM D-2414. This spherical carbon black may be used in more graphitized form if required for oxidation resistance by heating the material to 2,700° C. or greater. Of course, compatible materials such as silicon carbide can be used if the particle size is less than or equal to one micron.

EXAMPLE 1

A precursor sealing material suspension containing about seventy (70) weight percent Thermax carbon black was prepared in the following manner and used with a carbon fiber substrate. Five (5) grams of Triton surfactant (available from the Rohm and Haas Company, Inc., Philadelphia, Penna.) were added to two thousand (2000) grams of water. Twenty seven hundred (2700) grams of Thermax carbon black were blended into suspension using a low shear mixer. The amount of Thermax carbon black added was limited by the viscosity of the mixture. About half of the mixture was poured into a ball mill and dispersed (that is, broken up to about the prime particle size) for 24 hours. The dispensing action returned the mixture to a liquid condition that allowed adding another three hundred and thirty-six (336) grams of Thermax. The mixture was dispersed for another fifty (50) hours then five (5) grams of Triton were added. The additional surfactant enabled adding another four hundred forty-three (443) grams of Thermax carbon black. The mixture was returned to the ball mill for 24 hours. After 24 hours of dispersal, the mixture was too thick and five (5) grams of water and five (5) grams of Triton surfactant were added. After about two additional hours of dispersal, a sample was withdrawn from the mixture, evaporated and found to have 67.4% solids. After 24 hours of dispersal by ball milling another one hundrd forty-three (143) grams of Thermax were added which brought the solids level to 71.8%.

The precursor suspension of Example 1, having a solids content of seventy (70) weight percent and a viscosity of about one thousand (1,000) centipoises, was used to fill a carbon fiber substrate. The substrate was eight mils (0.080 inches) thick and had a mean pore size of thirty-six (36) microns.

The precursor suspension was extruded under a pressure of one hundred pounds per square inch through the screen, through the flow region and into the substrate. After filling, the substrate was dried to remove the water from the suspension. The density of the seal region was two hundred and thirty percent of the density of the substrate before being filled with the precursor suspension and the mean pore size was less than two microns. In particular, the density of the seal region was about 1.25 grams per cubic centimeter while the density of the substrate at a point removed from the seal region was fifty five hundredths of a (0.55) gram per cubic centimeter.

The edge seal so formed was filled with phosphoric acid ($H_3PO_4$) by submergence in eighty-five (85) weight percent $H_3PO_4$ at 325° F. for 1 hour. The capillarity characteristic of the seal (that is, the cross-pressure or bubble pressure for concentrated phosphoric acid at 75° F.) of this edge seal was measured to be nine (9) psi at 75° F. Other carbon fiber substrates have been impregnated with higher solid content precursor suspensions made as set forth in Example 1, but having a solids content as high as seventy-five (75) percent. The resulting density was two hundred and sixty percent of the density of the substrate in a non-seal region. The capillarity characteristic (cross-pressure) of the seal was measured to be thirty pounds per square inch.

EXAMPLE 1a

A similar precursor sealing material suspension containing about seventy (70) weight percent Thermax carbon black was prepared as discussed in Example 1 and used with two fiber carbon substrates as shown in FIG. 1a to demonstrate the feasibility of using this process to create a satisfactory seal structure 60 between two adjacent gas porous plates. The two carbon fiber substrates had a thickness of thirty-six (36) mils, a density of sixty-one hundredths (0.61) $gm/cm^3$ and a mean pore size of thirty-three (33) microns. The two porous plates were bonded together with two 5 mil thick films of FEP telfon as described by the process for forming the hydrophobic liquid barrier 62. This laminate was then impregnated with the Thermax suspension. The weight gain after impregnation was one-hundred and thirty (130) percent as was the weight gain in Example 1.

The structure formed was filled with phosphoric acid ($H_3PO_4$) by submergence in eight-five (85) weight percent ($H_3PO_4$) at three-hundred and twenty-five (325) degrees Fahrenheit for two hours. The gas permeability was measured through a hydrogen diffusivity test at atmospheric pressure with hydrogen in one chamber and hydrogen and nitrogen in a second chamber, the chambers being separated by the laminated structure to be thirty-five hundredths of a cubic centimeter per square foot per second (0.035cc/$ft^2$-sec). The resulting structure had a satisfactory voltage drop (commonly called iR) of 1.3 millivolts per 100 ASF at thirty (30) psi contact pressure and a satisfactory thermal conductivity for passing heat through the structure of three and three-tenths (3.3) Btu/hr-ft-°F.

EXAMPLE 1b

In contrast, two substrates bonded together with a 10 mil FEP teflon film were formed without a hydrophilic fine pore gas barrier layer. While the structure had a satisfactory iR of 1.3 millivolts at one hundred amps per square foot and a 30 psi contact pressure, the typical gas permeability of the structure as measured through a hydrogen diffusivity test was six (6.0) cubic centimeters of gas per square foot per second which is a hundred times higher than the acceptable requirement of six-hundredths (0.06)cc/ft$^2$-sec).

EXAMPLE 1c

Another seal structure 60b between two gas porous plates was prepared as shown in FIG. 1b using fine pore structures 66a and 70 to create the hydrophilic and hydrophobic barriers. The hydrophobic acid barrier contained about sixty (60) weight percent dry Teflon 60 powder manufactured by the E.I. duPont deNemours Company and forty (40) weight percent Vulcan XC-72 carbon black manufactured by the Cabot Corporation and was fabricated with a carbon loading of about 5 mg/cm$^2$. The dry powders were mixed in a two hundred (200) gram batch in a Lodige mixer for about twenty-five (25) seconds. The Lodige mixer is manufactured by Littleford Bros., Inc., Cincinnati, Oh. This mixture was then applied to a porous plate, by a process similar to the cloud process used to apply catalyst layers to a substrate as discussed in U.S. Pat. No. 4,177,159, Catalytic Dry Powder Material for Fuel Cell Electrodes Comprising Fluorocarbon Polymer and Precatalyzed Carbon issued to Roger M. Singer, resulting in a surface coating of about five (5) mg/cm$^2$. This layer was compacted by rolling at fifteen (15) pounds per lineal inch using twelve (12) inch diameter rolls; and sintered in a forced convection oven at six hundred and eighty (680) degrees Fahrenheit for about six and one half (6.5) minutes. The through plane electrical resistance of this composite was measured to be three (3) millivolts at one hundred (100) amps per square foot when measured at a contact pressure of one hundred (100) pounds per square inch at four hundred (400) degrees Fahrenheit.

A hydrophilic gas barrier containing about twenty (20) weight percent dry Teflon 60 powder resin (E. I. DuPont deNemours) and eighty (80) weight percent graphitized Vulcan XC-72 was fabricated with a graphite loading of twelve (12) mg/cm$^2$. The Vulcan XC-72 was graphitized (that is, made into more ordered carbon) by heating to twenty-seven hundred degrees (2700) centigrade for one (1) hour in an inert atmosphere. The processing conditions were the same as described above; except the sintering step was dones at six hundrd (600) degrees Fahrenheit. The through plane electrical resistance of this composite was measured to be three point three (3.3) millivolts at one hundred (100) amps per square foot when measured at one hundred (100) pounds per square inch contact pressure at four hundred (400) degrees Fahrenheit. The structure formed was filled with phosphoric acid (H$_3$PO$_4$) by submergence in eighty-five (85) weight percent (H$_3$PO$_4$) at 325° Fahrenheit for sixteen hours. The gas cross-over capillary characteristic was measured to be five and one-half (5.5) pounds per square inch. The gas permeability was to be 0.05 cubic centimeters of nitrogen per square foot per second at a pressure differential of eight (8) inches of water using a standard nitrogen permeability test.

EXAMPLE 2

A precursor sealing material suspension containing about seventy-four weight percent Thermax carbon black was prepared in a large batch process similar in many ways to the process used in Example 1. The precursor suspension was used to fill the edge region of a graphitized cellulose substrate having a mean pore size of twenty-one (21) microns.

The suspension was made in a large batch process in a twenty-four hour mix cycle through several additions of decreasing amounts of Thermax carbon black. Because of the large size of the batch (about nine gallons), a production size ball mill was used. This ball mill is manufactured by Paul O. Abbe, Inc., Little Falls, N.J.

The large batch process resulted in a better dispersion of the carbon black in suspension (about seventy-three percent) with a concomitant increase in the viscosity of the suspension to about six to seven thousand centipoise. Because of the smaller pore size, the viscosity of the precursor suspension was lowered about a third by adding water to reduce the solids content to sixty-nine percent, followed by a further dispersion of the suspension. The density of the seal region after drying was one hundred and ninety-nine (199) percent about two hundred percent) of the density of the non-sealing region of the substrate. The capillarity characteristic was eleven and one half (11.5) pounds per square inch for concentrated phosphoric acid at seventy-five degrees Fahrenheit.

EXAMPLE 3

A precursor sealing material suspension containing about seventy (70) to about seventy-one (71) weight percent carbon black was prepared using a Cowles Dissolver manufactured by the Cowles Dissolver Company, Inc., Cayuga, N.Y., and a Netzsch moliNEx agitator mill in series. A mixture was formed by mixing together a 12% dispersant, 23% dionized water, and 65% carbon black in the dissolver. The dispersant is a solution of 25% amino methyl propanol, 37.5% dimetyl formamide, and 37.5% of a trade chemical E-902-10-B available from the Inmont Corporation, Clifton, N.J. The resulting mixture and a solids content of about 70 to 71 percent. The viscosity was reduced by the addition of water from the viscosity as received from the agitator mill of greater than five thousand centipoise to a viscosity of several thousand centipoise. The addition of water also reduced the solids content from 70 to 71 percent solids content to 64 percent solids content. After completing the operation, the dispersed suspension was used to fill an electrolyte reservoir plate.

In this particular example, the electrolyte reservoir plate had a density 0.91 grams per cubic centimeter. After filling, the edge region of the electrolyte reservoir plate had a density of 1.34 grams per cc. An apapratus of the type shown in FIG. 2 was used to force the precursor suspension into the electrolyte reservoir plate because of the small pore size of the electrolyte reservoir plate of about 25 microns and the viscosity of the precursor suspension which was in excess of several thousand centipoise.

After filling the edge region, the electrolyte reservoir plate was dried to remove the liquid from the suspension and to deposit the high solids content mixture in the pores of the electrolyte reservoir plate without a gross volume change of the sealing material. This was confirmed by the high capillarity characteristic of the electrolyte reservoir plate which was thirty (30) psi for highly concentrated phosphoric acid (about 85 to 99 percent phosphoric acid) at 75° F.

During operation of a fuel cell containing an electrolyte reservoir plate having a seal region 66 or 66a and an edge seal filled with the sealing material described, the seal material will form an effective seal when wetted by the electrolyte to block the loss of the reactant gases from the fuel cell when the cell is placed in operation even though the transient cross-pressures approach values between five (5) psi and thirty (30) psi across the edge seal and across the seal region. This allows the fuel cell stack to operate at levels of pressure which may result in such pressure differentials between reactants during transient operation of the fuel cell without destroying the electrolyte seal and without the transfer of electrolyte between adjacent cells. In addition, the fuel cells operate with satisfactory levels of gas permeability, heat transfer (thermal conductivity) and electrical flow (electrical conductivity).

Although the invention has been shown and described with respect to detailed embodiments thereof, it should be understood by those skilled in the art that various changes in form and detail thereof may be made without departing from the spirit and the scope of the claimed invention.

We claim:

1. In a method of operating an electrochemical cell stack having a plurality of cells disposed adjacent to each other, each cell having a pair of electrodes and an electrolyte matrix extending therebetween, each electrode having an associated gas in close proximity to the electrode, each electrode including a gas porous substrate in contact with said electrolyte filled matrix, and including a gas porous plate adjacent to a gas porous plate of the adjacent cell, the electrochemical cell stack including a sealing structure to prevent the mixing of reactant gases from adjacent porous plates, wherein the improvement comprises:

employing a sealing structure which includes a gas permeable, hydrophobic liquid barrier which extends to block the movement of a liquid in a direction substantially normal to said boundary;

a seal region which is a portion of one of said porous plates adjacent to said hydrophobic liquid barrier that is filled with electrolyte to form a seal along the surface of the porous plate to block the leakage of a reactant gas across the electrolyte filled seal.

2. The method of operating an electrochemical cell of claim 1 wherein the seal region has a void structure having disposed therein a sealing material comprising an inert powder selected from the group consisting of carbon, graphite, silicon carbide and mixtures thereof, the powder having a low structure and the seal region having a density which is about two hundred (200) percent to about two-hundred and sixty (260) percent of the density of the porous plate in a region which does not contain said inert powder;

operating the fuel cell stack at reactant pressure level and with a difference in gas pressure across the seal such that the transient differences in gas pressure across the seal are equal to or greater than five pounds per square inch but less than or equal to thirty pounds per square inch.

3. The method of operating an electrochemical cell of claim 1 wherein the seal region extends as a portion of said porous plate in the lateral direction to the edge seal, the seal region having a first pore size distribution, the plate further having a region spaced from the seal region and from the edge seal which has a second pore size distribution, the first pore size distribution being smaller than the second pore size distribution and having a capillarity characteristic which adapts the seal region to form a hydrophilic gas barrier which extends in said second direction to said hydrophobic liquid barrier and laterally to said edge seal;

4. The method of operating an electrochemical cell of claim 2 wherein each gas porous plates is an electrolyte reservoir plate and the method includes the step of placing the electrolyte reservoir plate in liquid communication with said substrate and matrix.

5. The method of operating an electrochemical cell of claim 4 wherein the sealing material consists essentially of said powder and an amount of inert binder mixed with said powder which does not destroy the hydrophilic nature of the powder.

6. The method of operating an electrochemical cell of claim 5 wherein the binder is up to about five (5) percent polytetrafluoroetheylene by weight of the sealing material.

7. The method of operating an electrochemical cell of claim 3 wherein each gas porous plates is an electrolyte reservoir plate and the method includes the step of placing the electrolyte reservoir plate in liquid communication with said substrate and matrix.

* * * * *